United States Patent [19]

van der Pot

[11] 4,373,338
[45] Feb. 15, 1983

[54] SYSTEM FOR GENERATING ENERGY USING THE TEMPERATURE DIFFERENCE BETWEEN THE WATER TEMPERATURE AT THE SEA SURFACE AND THE WATER TEMPERATURE AT GREATER DEPTH

[75] Inventor: Barend J. G. van der Pot, Delft, Netherlands

[73] Assignee: Hollandsche Beton Groep N.V., Rijswijk, Netherlands

[21] Appl. No.: 222,226

[22] Filed: Jan. 2, 1981

[30] Foreign Application Priority Data

Jan. 11, 1980 [NL] Netherlands ......................... 8000183

[51] Int. Cl.³ .............................................. F03G 7/04
[52] U.S. Cl. ...................................... 60/641.7; 114/264
[58] Field of Search ........................... 114/264; 9/8 P; 60/641.7; 290/1 R

[56] References Cited

U.S. PATENT DOCUMENTS

| | | | |
|---|---|---|---|
| 3,805,515 | 4/1974 | Zener ................................. | 60/641.7 |
| 3,925,679 | 12/1975 | Berman et al. ..................... | 290/1 R |
| 4,014,279 | 3/1977 | Pearson ............................. | 60/641.7 |
| 4,312,288 | 1/1982 | Finsterwalder et al. ........... | 114/264 |

FOREIGN PATENT DOCUMENTS 2015689 9/1979 United Kingdom .

*Primary Examiner*—A. Michael Chambers
*Attorney, Agent, or Firm*—Sughrue, Mion, Zinn, Macpeak & Seas

[57] ABSTRACT

A system for generating energy by converting thermal energy into another form of energy by the exchange of water from great depth with surface water, said system comprising a floating installation having a downwardly directed cold water pipe as well as a number of thermal energy converting aggregates, said installation having the form of a pontoon, carrying a platform by means of columns, a number of box-shaped units containing the thermal energy converting aggregates being placed on top of the said pontoon, each unit having a channel with pump and heat exchanger, said channels having their inlets either in connection with the cold water supply or with the environmental water, the connection with the cold water being at the underside of the units and the connection with the environmental water at the upper side of the units, each channel having its outlet at the side of the pontoon. Said units each may have a warm water channel and a cold water channel or part of the units only contain cold water channels and another part only warm water channels.

3 Claims, 7 Drawing Figures

SYSTEM FOR GENERATING ENERGY USING THE TEMPERATURE DIFFERENCE BETWEEN THE WATER TEMPERATURE AT THE SEA SURFACE AND THE WATER TEMPERATURE AT GREATER DEPTH

The invention relates to a system for generating energy using the temperature difference between the water temperature at the sea surface and the water temperature at greater depth, which system comprises a floating installation from which a downwards directed cold water pipe is suspended opening into a cold water space isolated from the environmental water, and one or more aggregates for converting thermal energy into another form of energy such as electrical energy, for instance through heat exchanging the warm water and an evaporatable medium such as ammonia, which after the dispension of energy exchanges heat with the cold water, which floating installation comprises an submersible box shaped pontoon body with great dimensions in horizontal direction and relative small dimensions in vertical direction, which pontoon body has a number of columns which, in the submersed operating position of the pontoon body are crossing the water surface and carrying a platform or similar superstructure, said pontoon body comprising the cold water space in the form of a central room, closed at the underside and at the upper side, having an opening into the bottom for connecting the cold water pipe.

Systems of this type are known in the literature e.g. from U.K. specification No. 2,015,689. Especially for investigation purposes one has for instance proposed to connect the cold water pipe to an opening in the bottom of a ship in which ship the energy converting system is positioned. Test installations of this type are only suitable for experimental purposes and are not suited to be embodied as a big installation, that means an installation capable of delivering many hundreds megawatt of energy. Furthermore a ship is subjected to water surface movements resulting in an unfavourable transfer of loads to the cold water pipe.

It is furthermore known from the literature to embody an installation of this type as a high floating cylinder crossing the water surface with a section of smaller diameter and carrying a platform above the water surface. The cold water pipe is suspended from said cylinder and the energy converting apparatus is contained within the cylindrical body. Because such a body is crossing the water surface only with a small diameter and furthermore because of his great mass such a body will float rather stable in inquiet water so that the cold water pipe is less subjected to unfavourable loads resulting from the water movements. However, such a body of this type has such great dimensions in vertical direction that the transport from the construction site through shallow waters to the place of destination runs up against insurmountable difficulties.

An installation of this type as disclosed by the said U.K. specification No. 2,015,689 does not have this disadvantage and is suitable for transport through shallow waters without loss of the stable operating position. In said known installation the energy converting aggregates are mounted within the pontoon. This is not only complicated and expensive but also increases the weight of the pontoon before reaching its destination whilst difficulties exist with respect to the provision and distribution of ballast spaces. Object of the invention is to provide an installation such that the energy converting apparatus may be installed in a simple way after reaching the place of destination.

For that purpose the installation according to the invention is formed such that onto the top of the pontoon body a number of box-shaped units is positioned alongside each other, each containing at least one traversing channel with a pump and heat exchanger and with an input- and output opening, part of which channels is debouching the cold water space and another part of which is giving access to the environmental water above the pontoon body, said units having their output openings at the side corresponding to the side wall of the pontoon body, whereby the input of the cold water channel is at the under side connected to the cold water space and the input of the warm water channel is positioned at the upper side. This results into a systematic arrangement of the units in relation to the cold water space. Said box-shaped units may be transported to the place of destination in floating condition or transported on pontoons or ships and thereafter placed onto the pontoon body of the installation thus facilitating the transportionat, whilst within the pontoon there is a lot of space for balasting.

According to an embodiment of the invention each unit may comprise a warm water channel and a cold water channel and furthermore the energy conversion system with turbine and generator.

However, it is furthermore possible that a part of the units contains exclusively one or more cold water channels which are positioned near the cold water space and another of said units contains exclusively one or more warm water channels and these last mentioned units are positioned at greater distance from the cold water space, for instance near the corners of the pontoon body whereby the energy conversion system respectively the energy conversion systems are installed outside these units, for instance onto the platform. In this case all the cold water channels are positioned near to the cold water space and all the warm water channels are remote thereof. In this case said units are not embodied as complete energy conversion units and there is a connection necessary with further apparatuses which may be positioned into the pontoon body or onto the platform, but after exchanging heat exchange the water flowing out of the cold water channel, which water has an increased temperature, will have less easy influence on the temperature of the environmental water near the input opening of the warm water channels.

According to the invention the circular opening into the bottom, onto which the cold water pipe is connected, may be divided by a cross configuration of vertical walls into sectors and these walls are dividing the cold water space into a number of rooms equal to the number of sectors which rooms have smooth side walls at all sides and a roof with openings adapted for fitting to the unit input openings. Said cross configuration of vertical walls is not only favourable for the constructive strengthening of the pontoon body at the bottom opening, but also divides the cold water space into rooms constituting flow channels to the input openings of the cold water channels of the units which are mounted onto the pontoon. Said last mentioned units preferably have a length such, that the input opening(s) of the cold water channel(s) is (are) positioned above the cold water space.

With the system according to the invention it is possible to transport a very big concrete body to the place of destination and to lower said body to a certain depth, after which it is possible to suspend the cold water pipe and to install the heat exchange units, necessary for the energy conversion, as prefabricated units onto the pontoon and to connect them in a very simple way. This not only applies to units, which form a complete conversion unit, but also to units which contain exclusively warm water channels or cold water channels, whereby the heat exchangers are connected to the conversion circuit with turbine and generator which are installed somewhere else in the system, preferably readily accessible onto the platform. For said connection only isolated pipe lines are necessary which, eventually may run through the columns.

The invention will be explained in more detail with reference to the attached drawings.

Figure 1:
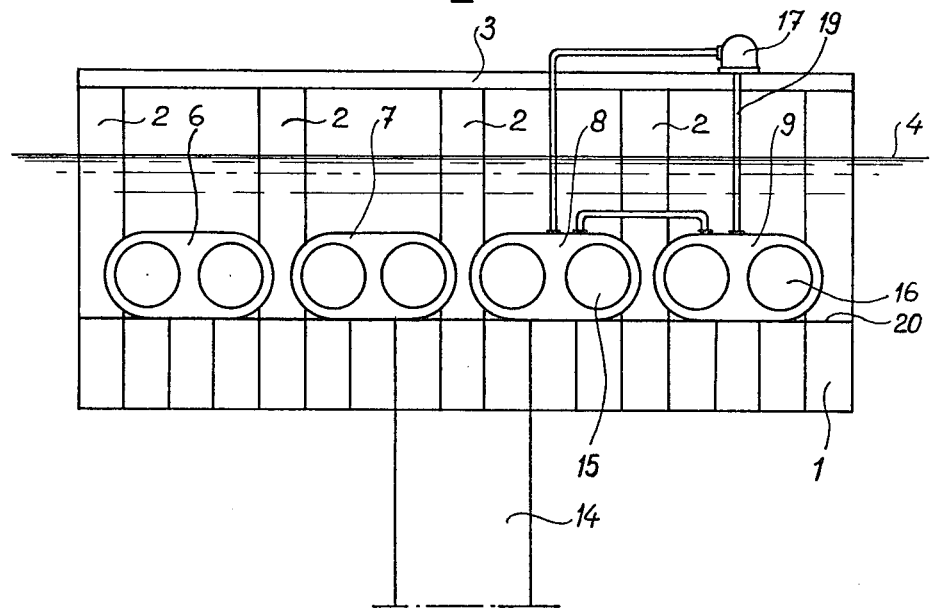
FIG. 1 shows a side view of the longer side of the installation according to the invention.
Figure 2:
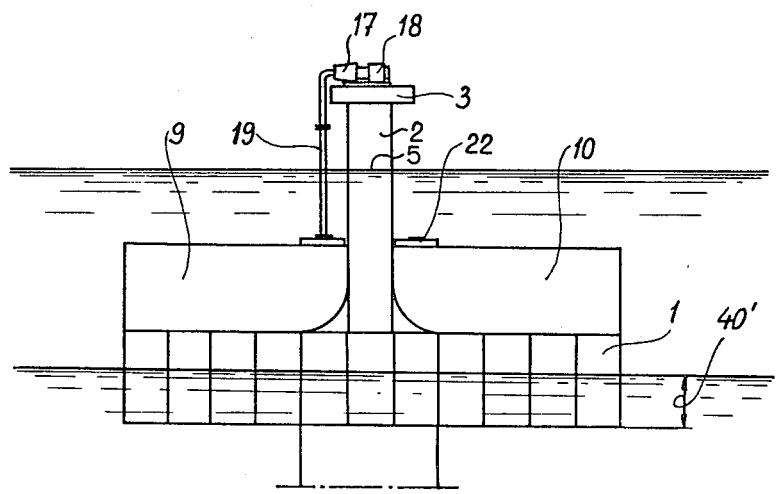
FIG. 2 shows a side view of the shortest side of the installation.
Figure 3:
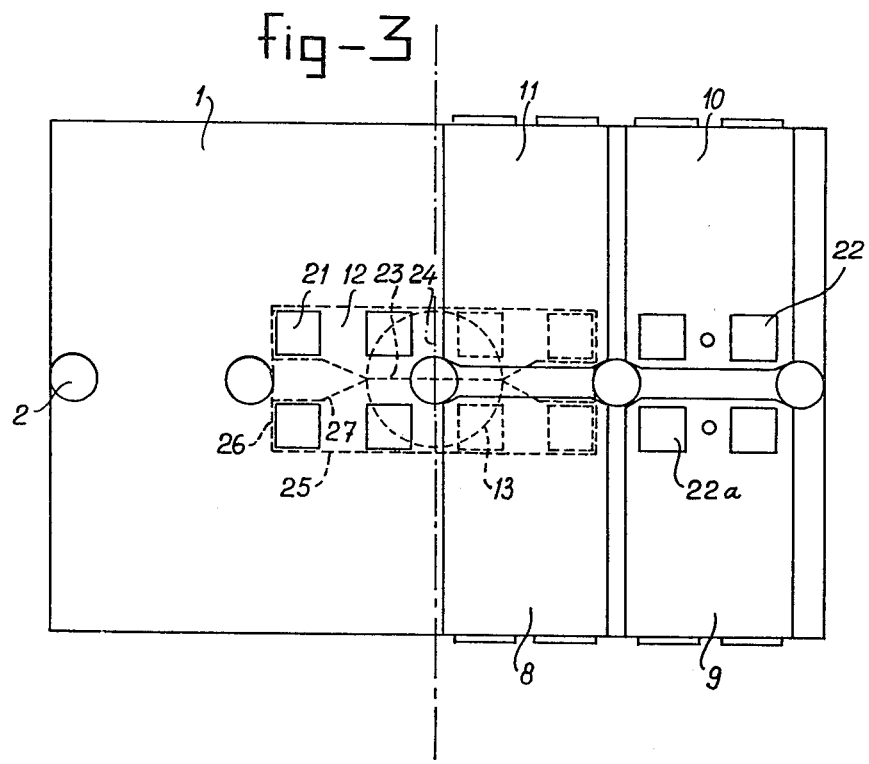
FIG. 3 shows a top view without the platform extending above the water surface.

The installation illustrated in FIGS. 1, 2 and 3 consists of a pontoon body 1 with a number of columns 2 and a platform or deck 3.

The illustrated pontoon body in this example has a length of 187 meter a width of 121 meter and a height of 22 meter. In the illustrated position the deck 3 is 20 meter above sea level, which level is denoted with 4. The total height is 80 meter so that the installation as a whole is reaching a water depth of 60 meter. During the transport respectively the construction phase the water level may be at the height of line 5 in FIG. 2. The pontoon body is in a well known manner constructed out of rooms and is submersed to the correct depth by supplying ballast, for instance water.

As is illustrated in FIG. 2 the width dimension of the platform or deck 3 is considerably smaller than the width of the pontoon body.

Above this pontoon body, which is preferably constructed out of concrete, the units 6 until 11 are positioned. These units, which are for instance constructed of metal, contain one or more pumps and an heat exchanger.

The units 7 and 8 and 11 (FIG. 3) are connected to the cold water space, which is denoted with dotted lines in FIG. 3, and has a circular input opening 13 for receiving the cold water from the cold water pipe 14 which is illustrated in FIG. 1 and is suspended from the pontoon body.

The output openings of these cold water units are positioned at the longest side of the pontoon body and are denoted with 15. The units 6, 9 and 10 at the corner positions have their input openings at the upper side and are therefore debouching into the warm environmental water. The output openings 16 of these units are also positioned at the longest side of the pontoon body.

In FIG. 2 it is schematically denoted that above the deck 3 a number of turbines 17 may be installed for driving generators 18, which turbines form part of an ammonia circuit which is through pipe lines 19 connected to the heat exchangers in the cold water units respectively the warm water units.

In FIG. 3 a number of cold water units and warm water units is removed to indicate clearly the openings 21 in the upper wall 20 of the pontoon body, onto which the input openings of the cold water units are connected.

The warm water units have input openings 22 at the upper side.

The cold water space 12 is divided by a cross configuration of vertical walls 23, 24 which are consolidating the opening 13, into four sectors each of which is bounded by the smooth walls 25, 26, 27. Two input openings of the cold water units are debouching into each of said four sectors.

Figure 5:
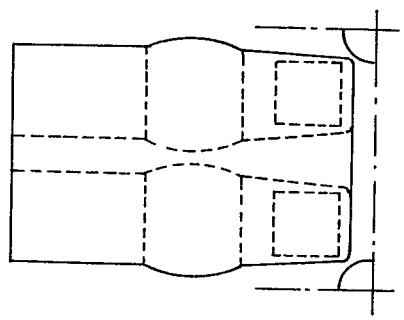
FIG. 5 shows a top view of another embodiment.
Figure 6:
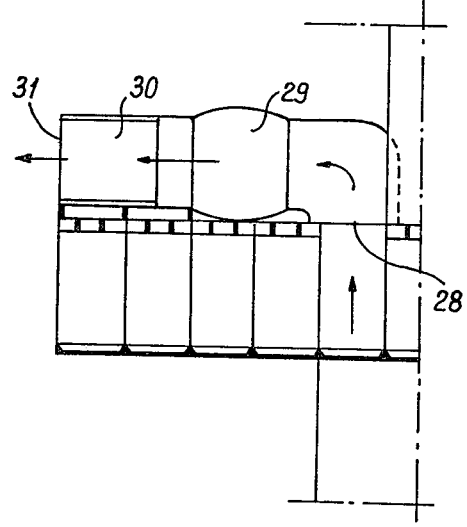
FIG. 6 shows a side view of the embodiment in FIG. 5.

In this embodiment the cold water units are positioned as closely as possible to the cold water space with the arm water units alongside. In FIGS. 5 and 6 a cold water unit is shown in more detail. Said unit has an input opening 28 at the under side, a heat exchange section 29, a pump 30 and an output opening 31.

Such a unit may be preconstructed and transported to the place of destination to be secured onto the pontoon body 1.

Figure 4:
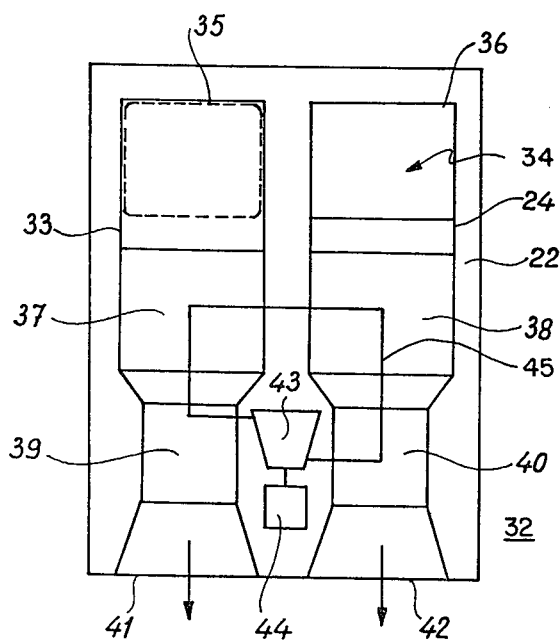
FIG. 4 shows schematically a possible embodiment of an unit.

A warm water unit is embodied in principle in the same way, however, the input opening is thereby positioned at the upper side as is denoted with 22 in FIG. 3. FIG. 4 shows an alternative embodiment of the unit. According to this embodiment the unit 32 contains a cold water channel 31 and a warm water channel 34. The cold water channel has an opening at the under side of the unit, indicated with 35 and the warm water channel has an opening at the upper side, indicated with 36.

The heat exchangers are positioned at 37 and 38, the pumps are positioned at 39 and 40 and the output openings are indicated with 41 respectively 42.

These units may be mounted the same way as the units 6 until 11. However, in these units 32 the turbine 43 with generator 44 and the ammonia circuit 45, connected to the heat exchangers 37 and 38, are already installed. Therefore these units are complete energy converting units. After installation it is only necessary to lay the cables to the deck.

Said units have only one cold water input, so that, when said units are installed alongside each other, the cold water inputs have a greater mutual distance. Therefore the cold water space should extend further in the length direction of the pontoon body such that the opening 22a in FIG. 3, supposing that this opening is a cold water input, is covered. However, one can imagine other adapted configurations.

Figure 7:
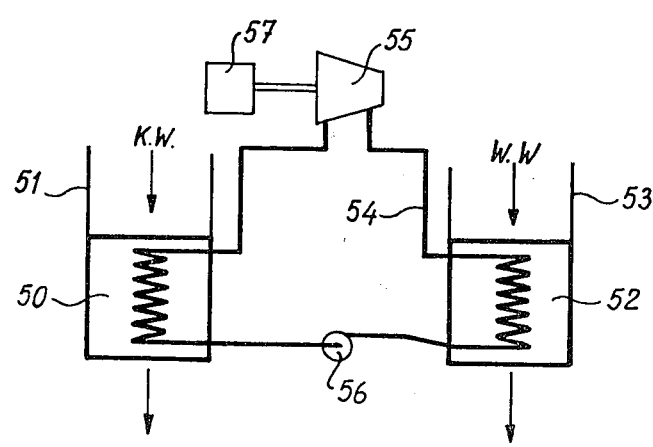
FIG. 7 shows an operating scheme, which is known for itself.

Finally FIG. 7 shows schematically the converting circuit which is itself known.

Said figure shows the heat exchanger 50 in the cold water line 51 and the heat exchanger 52 in the warm water line 53. Said line circuit which is in general indicated with 54 and is running through said heat exchangers and also through the turbine 55 may be filled with an evaporatable liquid such as ammonia, which liquid is evaporated by heating by means of the water. The vapour is driving the turbine 55 after which the vapour at the output is condensed in the heat exchanger 50 whereafter the condensed liquid is pumped back by means of the pump 56 to the heat exchanger 52. The turbine 55 drives a generator 57.

Instead of a closed loop ammonia circuit for converting the temperature difference into another form of energy it is also possible to use other means. One could for instance evaporate the warm water in vacuum and drive a low pressure turbine with the vapour, after which the vapour is condensed by means of heat exchange with cold water. An extra advantage is the recovering of fresh water.

I claim:

1. In a floating device for generating energy by using a temperature difference between the water temperature at the sea surface and the water temperature at a great depth therefrom, said device including a pontoon; a plurality of columns mounted on said pontoon, said columns intersecting the water surface in the operative position of the device with said pontoon below water level; an upper structure mounted on said columns; a downwardly extending cold water duct suspended from said pontoon; a plurality of energy converting units attached to said columns below water level, each of said energy converting units comprising at least one traversing channel with a pump and heat exchanger, and said energy converting units being in connection with said downwardly extending cold water duct and in connection with warm water of the environment therearound; and means for converting thermal energy resulting from said temperature difference into another form of energy, the improvement comprising said pontoon being box shaped and having a closed central cold water chamber defined by an upper wall, a lower wall and inner walls, said lower wall being joined to said cold water duct; and wherein said energy converting units are mounted upon a flat upper side of said pontoon, said energy converting units having outlet openings at a side of one side wall of said pontoon with a cold water channel inlet being formed at a lower side of said side wall joining an opening in said upper wall of said cold water chamber and having a warm water channel inlet in said upper side.

2. The device according to claim 1, wherein a predetermined number of said plurality of energy converting units have only at least one cold water channel, said units of said predetermined number of said energy converting units are mounted adjacent to said cold water chamber, remaining ones of said plurality of energy converting units have only at least one warm water channel, said remaining ones of said plurality of energy converting units are mounted at a greater distance from said cold water chamber than said units of said predetermined number of said energy converting units at corners of said pontoon, and further comprising at least one energy converting system provided outside said units upon said platform.

3. The device according to claim 1, wherein a circular opening is provided in a bottom of said pontoon to which said cold water duct is connected, and a plurality of vertical walls is provided dividing said circular opening in a cross configuration of sectors, said vertical walls also dividing said cold water chamber into a plurality of compartments equal in number to the number of said sectors, and said compartments are surrounded by smooth side walls and have a top wall with openings adapted for fitting to corresponding inputs of said units.

* * * * *